United States Patent
Ohno

(10) Patent No.: US 9,033,076 B2
(45) Date of Patent: May 19, 2015

(54) VEHICLE

(75) Inventor: Yoshikazu Ohno, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/115,041

(22) PCT Filed: May 12, 2011

(86) PCT No.: PCT/JP2011/060929
§ 371 (c)(1),
(2), (4) Date: Oct. 31, 2013

(87) PCT Pub. No.: WO2012/153413
PCT Pub. Date: Nov. 15, 2012

(65) Prior Publication Data
US 2014/0073147 A1    Mar. 13, 2014

(51) Int. Cl.
*B60K 1/00*    (2006.01)
*H01R 13/44*    (2006.01)
*B60K 1/04*    (2006.01)
*B60L 11/18*    (2006.01)
*B60K 15/063*    (2006.01)

(52) U.S. Cl.
CPC ... *H01R 13/44* (2013.01); *B60K 1/04* (2013.01); *B60K 2001/0416* (2013.01); *B60K 2015/0638* (2013.01); *B60Y 2306/01* (2013.01); *B60L 11/1818* (2013.01); *Y02T 10/7005* (2013.01); *Y02T 90/14* (2013.01)

(58) Field of Classification Search
CPC .............. B60K 1/00; B60K 6/46; B60K 6/20
USPC .................. 180/65.25, 65.29, 65.1
See application file for complete search history.

(56) References Cited

U.S. PATENT DOCUMENTS

| | | | |
|---|---|---|---|
| 5,617,003 A * | 4/1997 | Odachi et al. ................. | 320/108 |
| 5,850,135 A * | 12/1998 | Kuki et al. ..................... | 320/108 |
| 8,072,182 B2 * | 12/2011 | Vasilantone ................... | 320/104 |
| 8,098,044 B2 * | 1/2012 | Taguchi ......................... | 320/109 |
| 8,853,996 B2 * | 10/2014 | Sekido et al. ................. | 180/65.1 |
| 2010/0270860 A1 * | 10/2010 | Kamaga ........................ | 180/65.29 |
| 2012/0049799 A1 | 3/2012 | Terashima et al. | |
| 2013/0030635 A1 * | 1/2013 | Morita .......................... | 180/65.25 |
| 2013/0078846 A1 * | 3/2013 | Sasaki et al. .................. | 439/374 |
| 2013/0249282 A1 * | 9/2013 | Ishii et al. .................... | 307/10.1 |

FOREIGN PATENT DOCUMENTS

| | | |
|---|---|---|
| JP | 7 201369 | 8/1995 |
| JP | 11 332003 | 11/1999 |

(Continued)

OTHER PUBLICATIONS

International Search Report Issued Jun. 21, 2011 in PCT/JP11/060929 Filed May 12, 2011.

*Primary Examiner* — Hau Phan
(74) *Attorney, Agent, or Firm* — Oblon, McClelland, Maier & Neustadt, L.L.P.

(57) ABSTRACT

A vehicle in which trouble at the time of charging after a collision can be suppressed is provided. The vehicle is a vehicle capable of being charged from an external power supply, including a vehicle body having a charge port, and a guide rail provided around the charge inlet in such a manner that upon experiencing an external shock, it deforms to cover the charge inlet.

9 Claims, 4 Drawing Sheets

(56) References Cited

FOREIGN PATENT DOCUMENTS

| JP | 3266015 B2 | 1/2002 |
| JP | 2003 151841 | 5/2003 |
| JP | 2009-136110 A | 6/2009 |
| JP | 2011-020601 A | 2/2011 |

\* cited by examiner

US 9,033,076 B2

VEHICLE

TECHNICAL FIELD

This invention relates to a vehicle, and more particularly to a vehicle having a charge inlet.

BACKGROUND ART

Conventionally, vehicles have been disclosed in, for example, Japanese Patent Laying-Open No. 11-332003 (PTD1) and Japanese Patent Laying-Open No. 2003-151841 (PTD2).

CITATION LIST

Patent Document

PTD 1: Japanese Patent Laying-Open No. 11-332003
PTD 2: Japanese Patent Laying-Open No. 2003-151841

SUMMARY OF INVENTION

Technical Problem

PTD1 discloses an electric vehicle having a charge inlet provided on the front of the vehicle. PTD2 discloses a small, electrically powered vehicle having a tapered guide portion provided at a charge-side connector (charge inlet).

Conventional vehicles each have had a problem in that when a charge inlet and its related parts are damaged by experiencing an external shock due to an accident or the like, a user charges the vehicle from an external power supply, which causes trouble in the vehicle.

Accordingly, this invention was made to solve the above-described problem, and an object of the invention is to provide a vehicle in which trouble in the vehicle can be prevented.

Solution to Problem

A vehicle according to this invention is a vehicle capable of being charged from an external power supply, including a vehicle body having a charge inlet, and a guide member into which a charging paddle connected to the charge inlet is inserted, the guide member being provided around the charge inlet in such a manner that upon experiencing an external shock, it deforms to cover the charge inlet.

In the vehicle structured as above, upon experiencing an external shock, the guide member deforms to cover the charge inlet. Consequently, charging after the shock can be prohibited, thus suppressing the occurrence of trouble in the vehicle.

Preferably, the guide member is a guide rail.

Preferably, the guide rail is manufactured by twisting a plate-shaped member.

Preferably, the charge inlet is provided on a front of the vehicle body.

Preferably, the charge inlet includes a first charge port for high-voltage charging and a second charge port for low-voltage charging.

DESCRIPTION OF EMBODIMENTS

Figure 1:
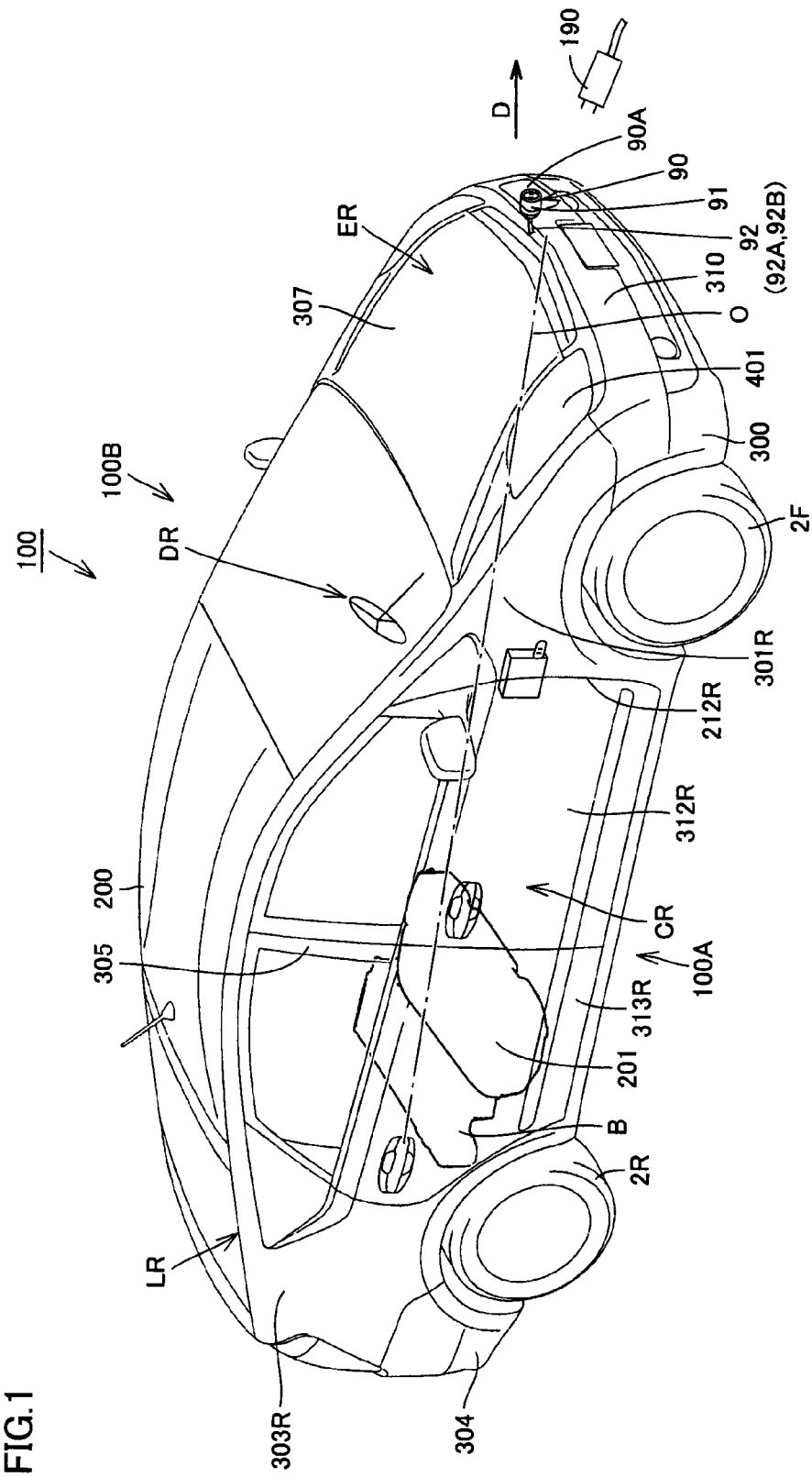
FIG. 1 is a perspective view of a vehicle having a charge port according to a first embodiment of this invention.

Embodiments of this invention will hereinafter be described with reference to the drawings. In the embodiments provided below, identical or corresponding parts will be denoted by identical reference characters, and description thereof will not be repeated. It is also possible to combine the embodiments.

(First Embodiment)

FIG. 1 is a perspective view of a vehicle having a charge port according to a first embodiment of this invention. With reference to FIG. 1, a vehicle 100 is a hybrid vehicle and includes a vehicle main body 200 formed of a body and exterior parts, a pair of front wheels (wheels) 2F provided on a front side in a traveling direction D of vehicle 100, and rear wheels (wheels) 2R provided on a rear side in traveling direction D.

Vehicle main body 200 includes an engine compartment ER provided on a traveling direction D-side of vehicle 100, a cabin room CR adjacent to engine compartment ER on a rear side thereof in traveling direction D, and a trunk room LR adjacent to cabin room CR on a rear side thereof in traveling direction D.

A monocoque body, for example, is employed as the body of vehicle main body 200, and this body includes a front wall portion provided on a front face-side thereof in traveling direction D, a cabin wall portion defining cabin room CR, and a rear wall portion provided on a rear side of this cabin wall portion.

An opening 212R, which communicates with cabin room CR and through which an occupant can get into/out of the vehicle, is provided on a side face of the body. A plurality of exterior parts are mounted on surfaces of the body structured as above to form vehicle main body 200.

The exterior parts include a front bumper 300 including a front bumper cover 310 and being provided on a lower side of the front face-side of vehicle main body 200, a front fender 301R provided to cover a side face of the front wall portion, and a front door 312R and a rear door 313R provided to allow opening and closing of opening 212. Each of front door 312R and rear door 313R is provided with a sash 305.

The exterior parts also include a hood 307 serving as an upper cover of engine compartment ER, a rear fender 303R provided on a rear side of rear door 313R in traveling direction D, and a rear bumper 304 provided in a lower portion of rear fender 303R.

Cabin room CR is provided with a driver seat for operating vehicle 100, a passenger seat next to the driver seat in a width direction of vehicle 100, and a back seat provided behind the passenger seat and driver seat. The driver seat is offset toward a right side face (one side face) 100A of vehicle 100 with respect to a center line O of vehicle 100 that extends in traveling direction D.

An internal combustion engine for generating motive power for driving front wheels 2F is housed in engine compartment ER. A charge port 90 includes a connecting portion 91, which is provided on the front of the vehicle and to which a plug 190 can be connected, a cover 90A, which is formed in the front bumper cover 310, and allows connecting portion 91 to be exposed to the outside or housed in vehicle 100, and wires 92A, 92B connected to connecting portion 91. Here, plug 190 is a charging connector for supplying electric power to a battery B and charging battery B, and is a connector for supplying electric power supplied from a commercial power supply (for example, single-phase AC 100 V in Japan) to battery B. Plug 190 may, for example, be a receptacle connected to a household power supply in an ordinary home.

An internal combustion engine for generating motive power for driving front wheels 2F is accommodated in engine compartment ER. Battery (charger) B, such as a fuel cell, a large-capacity capacitor, or the like, is disposed behind the back seat in traveling direction D.

It is noted that a method of supplying and receiving electric power between plug 190 and charge port 90 may be a contact-type (contacting) in which at least a portion of plug 190 and at least a portion of charge port 90 come into direct contact with each other, or a non-contact type (inductive).

Although charge port 90 is provided in front bumper cover 310 in this example, it may be provided on another site, such as front fender 301R, front door 312R, rear door 313R, rear fender 303R, and rear bumper 304.

Although an example in which vehicle 100 is charged is shown here, not only a hybrid vehicle but also an electric vehicle not carrying an internal combustion engine may also be supplied with electric power through plug 190. It is noted that a fuel tank 201 is provided adjacent to battery B.

Further, the vehicle to which electric power is to be supplied may be any vehicle with two or more wheels. That is, not only the four-wheeled vehicle as shown in FIG. 1 but also a two-wheeled vehicle or a vehicle with six or more wheels such as a truck may also be used.

Figure 2:
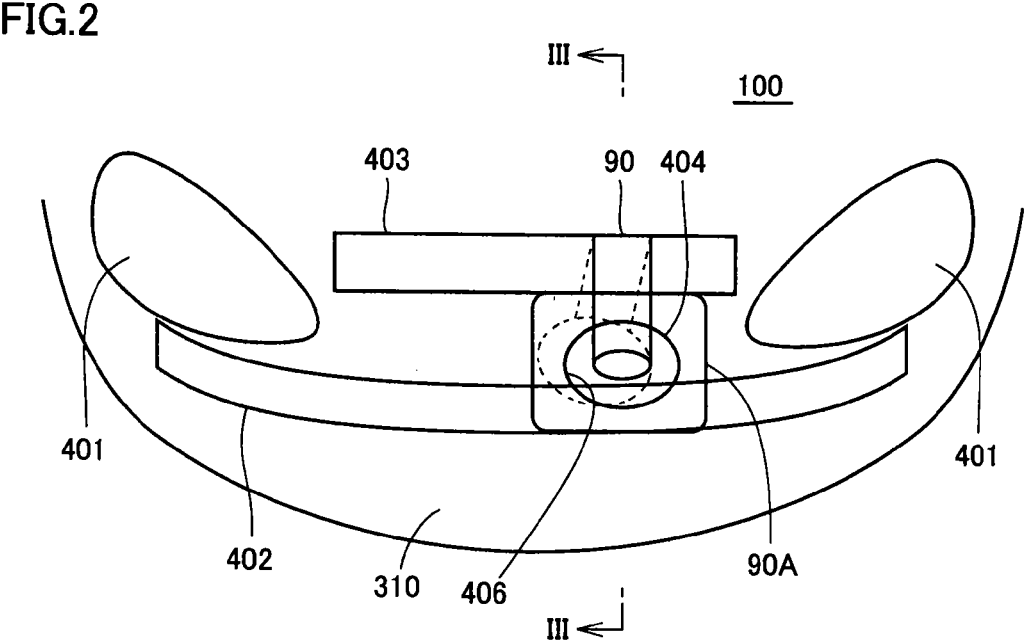
FIG. 2 is a diagram of the vehicle according to this invention shown in FIG. 1 when viewed from the front.
Figure 3:
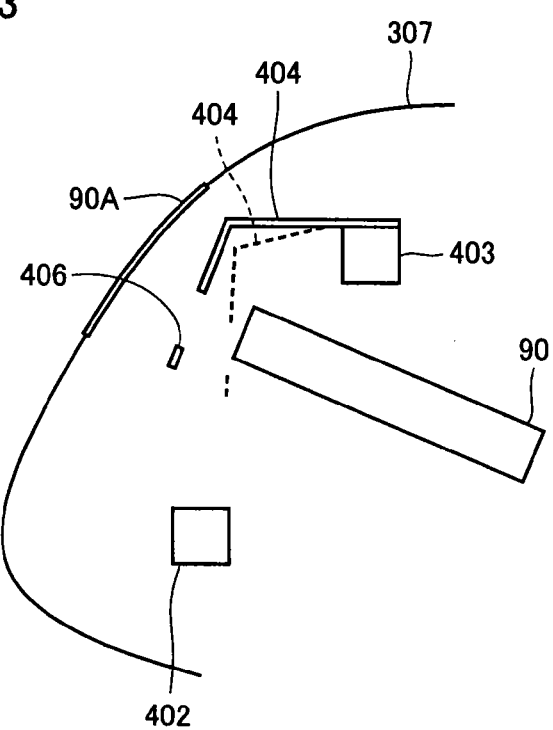
FIG. 3 is a cross-sectional view taken along the line in FIG. 2.

FIG. 2 is a diagram of the vehicle according to this invention shown in FIG. 1 when viewed from the front. FIG. 3 is a cross-sectional view taken along the line III-III in FIG. 2. With reference to FIGS. 2 and 3, vehicle 100 according to the embodiment is a vehicle that requires charging from an external power supply, such as an electric vehicle (EV), a plug-in hybrid vehicle (PHV), or the like. Charge port 90 is disposed on the front of the vehicle. A member for securely protecting, in the event of a collision, charge port 90 serving as a charge inlet is not provided. Charge port 90 is provided between a radiator upper support 403 and a bumper reinforcement 402. Charge port 90 is installed between right and left headlights 401. A plate-shaped guide rail 404 for inserting a charging paddle is provided around charge port 90. Guide rail 404 has a function of prohibiting charging after a collision. Guide rail 404 deforms at the time of a collision and covers charge port 90, thereby preventing the charging paddle from being connected to charge port 90. Before a collision, charge port 90 is completely exposed through a hole 406 formed in guide rail 404, however, after a collision, a portion of charge port 90 is not exposed through hole 406 to prevent charging.

The positions indicated by dotted lines in FIGS. 2 and 3 show positions of guide rail 404 and opening 406 after a collision. After a collision, guide rail 404 covers charge port 90.

Figure 4:
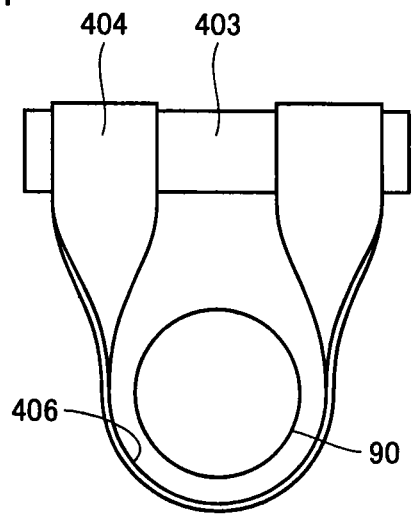
FIG. 4 is an enlarged view of a guide rail.

FIG. 4 is an enlarged view of the guide rail. With reference to FIG. 4, guide rail 404 attached to radiator upper support 403 is made of, for example, a metal plate, and disposed in a U-shape. The thin plate-shaped metal plate is then twisted to form opening 406, which is located over charge port 90. By employing the twisted metal plate, a structure that easily deforms at the time of a collision can be achieved. At the time of a collision, a shock in a front-back direction of the vehicle is applied to guide rail 404. The guide rail becomes easily deformed by this shock.

Although guide rail 404 is made of a twisted metal plate in FIG. 4, it is not limited thereto, and guide rail 404 may also be made of a flat, untwisted plate.

Figure 5:
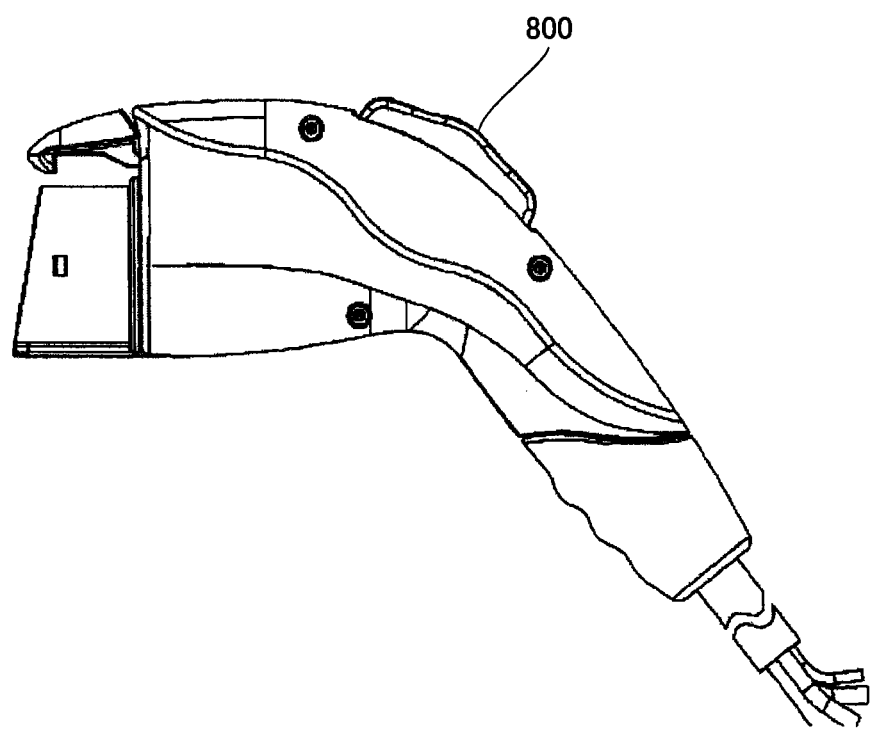
FIG. 5 is a side view of a charging paddle.
Figure 6:
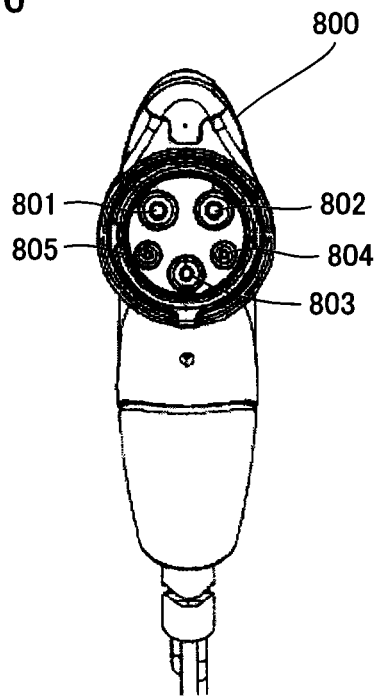
FIG. 6 is a front view of the charging paddle.

FIG. 5 is a side view of a charging paddle. FIG. 6 is a front view of the charging paddle when viewed in a direction indicated by an arrow VI in FIG. 5. With reference to FIGS. 5 and 6, a charging paddle 800 is provided with charging terminals 801, 802, 803, 804, and 805. Each of charging terminals 801, 802, 803, 804, and 805 serves to supply electric power, transmit an electrical signal, and to ground, for example.

In vehicle 100 according to this invention structured as above, charging paddle 800 is connected to charge port 90 in order to supply electricity from a charging device, and charging is started. In the event of a collision, if charge port 90 and its related sites are damaged, there is a concern that trouble may occur by connecting charging paddle 800. In order to prevent this, guide rail 404 for introducing insertion of charging paddle 800 into charge port 90 is provided, and guide rail 404 deforms at the time of a collision, thereby preventing charging paddle 800 from charging through charge port 90.

(Second Embodiment)

Figure 7:
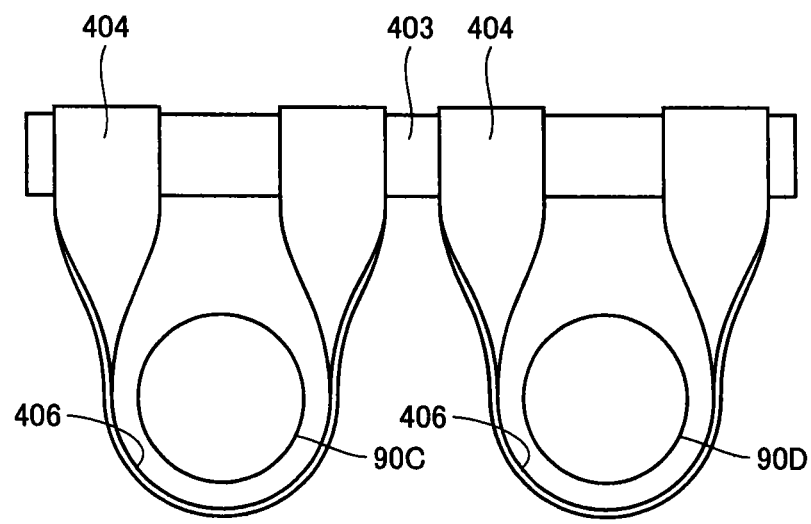
FIG. 7 is a diagram showing how two charge ports are disposed in a vehicle according to a second embodiment of this invention.

FIG. 7 is a diagram showing how two charge ports are disposed in a vehicle according to a second embodiment of this invention. With reference to FIG. 7, in vehicle 100 according to the second embodiment, two charge ports, i.e., a low-voltage charge port 90C and a high-voltage charge port 90D, are provided. Charging at a voltage of 100V from an ordinary home is performed through low-voltage charge port 90C, while charging at a voltage equal to that of battery B is performed through high-voltage charge port 90D, enabling rapid charging.

Both low-voltage charge port 90C and high-voltage charge port 90D are covered with guide rail 404.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

90: charge port, 90A: cover, 90C: low-voltage charge port, 90D: high-voltage charge port, 91: connecting portion, 92A, 92B: wire, 100: vehicle, 404: guide rail.

The invention claimed is:

1. A vehicle capable of being charged from an external power supply, the vehicle comprising:
   a vehicle body having a charge inlet; and
   a guide member that is attached to the vehicle body and that receives a charging paddle that connects to said charge inlet so the charging paddle is inserted into the guide member, said guide member being provided around and separate from said charge inlet in such a manner that upon receiving a force external from the vehicle, the guide member deforms to at least partially cover the charge inlet, thereby preventing the charging paddle from being inserted into the guide member to connect to the charge inlet.

2. The vehicle according to claim 1, wherein said guide member is a guide rail.

3. The vehicle according to claim 2, wherein said guide rail is manufactured by twisting a plate-shaped member.

4. The vehicle according to claim 1, wherein said charge inlet is provided on a front of said vehicle body.

5. The vehicle according to claim 1, wherein said charge inlet includes a first charge port for high-voltage charging and a second charge port for low-voltage charging.

6. The vehicle according to claim 1, further comprising:
a radiator upper support,
wherein the guide member is attached to the radiator upper support and extends at an angle from the radiator upper support in front of the charge inlet.

7. The vehicle according to claim 1, further comprising:
a front bumper cover,
wherein a cover of the charge inlet is formed in the front bumper, and
wherein the guide member is separate from the cover and positioned between the cover and the charge inlet in the vehicle.

8. The vehicle according to claim 7, further comprising:
a radiator upper support,
wherein the guide member is attached to the radiator upper support and extends at an angle from the radiator upper support in front of the charge inlet.

9. The vehicle according to claim 1, wherein the guide member includes a face having an opening, located over the charge inlet, through which the charging paddle extends when inserted into the guide member to connect to the charge inlet, and wherein, upon receiving the force external from the vehicle, the location of the opening is changed such that the face at least partially covers the charge inlet.

\* \* \* \* \*